United States Patent Office 2,758,095
Patented Aug. 7, 1956

2,758,095
CALCIUM ZINC PHOSPHATE PHOSPHOR

Robert W. Wollentin, Bloomfield, and Rudolph Nagy, Upper Montclair, N. J., assignors to Westinghouse Electric Corporation, East Pittsburgh, Pa., a corporation of Pennsylvania No Drawing. Application November 7, 1952, Serial No. 319,423

11 Claims. (Cl. 252—301.6)

Our invention relates to luminescent materials and, more particularly, to a phosphor which has an improved response in the erythemal region of the spectrum to radiation of 2537 A. U.

The principal object of our invention is to provide a calcium zinc phosphate activated by thallium which has an improved response in the erythemal region to radiation of 2537 A. U.

Another object of our invention is to provide a calcium zinc phosphate phosphor activated by thallium which has improved stability at lamp lehring temperatures of approximately 1100 to 1150°.

A further object of our invention is to provide a calcium zinc phosphate phosphor activated by thallium which, when incorporated into low pressure mercury vapor lamps, allows a lamp to be produced which has a reduced tendency toward wiggling.

We have found that the thallium activated calcium zinc phosphate phosphor described in Patent No. 2,563,900 to the present inventors and assigned to Westinghouse Electric Corp., may be improved by the addition, in small proportions, of a phosphate of aluminum, barium, magnesium, strontium, or potassium. The addition of one of the above-mentioned phosphates increases the stability of the phosphor at higher temperatures enabling lamps made with the phosphor to be lehred at higher temperatures without loss of output. Lehring at higher temperatures is desirable in making fluorescent suntan lamps because it tends to reduce what is known in the art as "wigglers." The output of a calcium zinc phosphate phosphor activated by thallium after lehring will also be higher if the phosphor has in solid solution therewith one of the above-mentioned phosphates.

The thallium activated calcium zinc phosphate phosphor of the above-mentioned patent is essentially a thallium activated phosphate of calcium having from about 4% to about 12% by weight of the final phosphor of zinc phosphate in solid solution therewith, the optimum percentage being approximately 8%. According to our invention, this phosphor may be improved by adding small proportions of the phosphate of aluminum, barium, strontium, magnesium, and potassium. Aluminum phosphate and magnesium phosphate may be added in proportions constituting up to 1% by weight of the final phosphor while barium phosphate and potassium phosphate may be added in proportions up to 2½% and strontium phosphate up to 2%, all percentages being by weight of the final phosphor. The optimum percentage of aluminum and magnesium phosphates is approximately 0.25; of barium and strontium phosphates, approximately 0.5; and of potassium phosphate, approximately 1.0. All proportions up to the maximum allowable proportions given will yield increased outputs intermediate that obtainable from the straight thallium activated calcium zinc phosphate phosphor not containing an addition of one of the above specified phosphates. Practically, our improved phosphor will contain at least approximately 0.01% of one of the above-mentioned phosphates.

In the synthesis of these phosphors, solid solutions are prepared through heat treatment of a mixture of the raw mix components of calcium zinc phosphate activated by thallium and one of the phosphates of aluminum, barium, strontium, magnesium, or potassium. Calcium, zinc, and thallium may be supplied in the form of the oxide, carbonate, secondary or tertiary phosphates, or any compound that will react to form tertiary phosphates. If the calcium is supplied in any form except the phosphate form, diammonium phosphate may be used to supply the phosphate radical. The aluminum, barium, strontium, magnesium, or potassium may be added as phosphates, nitrates, hydroxides or any other compound that will form phosphates upon decomposition and subsequent combination with the phosphate radical which may again be supplied by diammonium phosphate. We have found that a convenient form of aluminum is an aluminum hydroxide of special luminescent purity which is generally available from commercial supplies by this designation. A convenient form of strontium, barium and potassium is the carbonate of ordinary reagent grade purity.

The following table gives examples of phosphors prepared according to our invention where calcium is supplied in the form of tertiary calcium phosphate and the carbonate is used to supply strontium, barium, and potassium when used and aluminum hydroxide is used to supply aluminum when used. The raw ingredients as given in the table may be dry milled to form an intimate mixture and then fired for 1½ to 2 hours at 1000° C. preferably in covered silica trays. If desired, however, the batch may be wet milled in acetone or other suspending medium, dried, and then fired according to the above schedule:

| Raw Mix Component | Moles | | | | | | |
|---|---|---|---|---|---|---|---|
| | A | B | C | D | E | F | G |
| Ca$_3$(PO$_4$)$_2$ | 1.00 | 1.0 | 1.0 | 1.0 | 1.0 | 1.0 | 1.0 |
| ZnO | 0.193 | 0.193 | 0.193 | 0.193 | 0.193 | 0.193 | 0.193 |
| (NH$_4$)$_2$HPO$_4$ | 0.256 | 0.327 | 0.241 | 0.245 | 0.259 | 0.237 | 0.238 |
| Tl$_2$SO$_4$ | 0.0329 | 0.0329 | 0.0329 | 0.0329 | 0.0329 | 0.0326 | 0.0326 |
| Al(OH)$_3$ | 0.00635 | 0.0127 | | | | | |
| Ba$_3$(PO$_4$)$_2$ | | | | | | | |
| BaCO$_3$ | | | 0.0309 | | | | |
| K$_2$CO$_3$ | | | | 0.0212 | 0.0424 | | |
| MgO | | | | | | .0084 | |
| SrCO$_3$ | | | | | | | .010 |

The following table gives raw mix compositions for phosphors according to our invention wherein calcium is supplied in the form of the carbonate, zinc in the form of a tertiary phosphate, aluminum in the form of either the phosphate or the hydroxide, barium as either phosphate or carbonate, and potassium as either phosphate or carbonate. In preparing the phosphors of the following table, the ingredients, with the exception of the activator or activator supplying compound, are intimately mixed, preferably by grinding in a dry state or by suspension in a liquid medium, and then fired at 300° C. for 2 or more hours. The resultant mass is broken up and shifted through a 100 mesh screen and refired at 300° C. for another 2 hours. The thallium supplying compound is intimately mixed with the resultant fired product and the mixture subjected to repeated firings at approximately 950° C. There are preferably half-hour intervals between firings. The repeated firings are continued until the maximum output of the phosphor is obtained.

| Raw Mix In- | Moles | | | | | |
|---|---|---|---|---|---|---|
| | H | I | J | K | L | M |
| CaHPO4 | | 2.0 | | 2.0 | | 2.0 |
| Zn3PO4 | 0.0642 | | 0.0642 | | 0.0642 | |
| ZnO | | 0.193 | | 0.193 | | 0.193 |
| CaCO3 | 3.0 | 1.0 | 3.0 | 1.0 | 3.0 | 1.0 |
| (NH4)2PO4 | 2.0 | 0.157 | 2.0 | 0.136 | 2.0 | 0.145 |
| AlPO4 | .00635 | | | | | |
| Al(OH)3 | | .00635 | | | | |
| BaCO3 | | | .00257 | .00772 | | |
| Ba3(PO4)2 | | | | | | |
| K3PO4 | | | | | .0141 | |
| K2CO3 | | | | | | 0.0212 |
| Tl3PO4 | 0.0217 | 0.0326 | 0.0217 | 0.0326 | 0.0217 | 0.0326 |

The following table shows the light output at zero hour in E vitons of lamps made with a thallium activated calcium zinc phosphate having the phosphate indicated in solution therewith as compared with a factory produced lamp as control embodying thallium activated calcium zinc phosphate:

| Phosphate Added | Percent by Weight | Output |
|---|---|---|
| AlPO4 | 0.25 | 201,400 |
| Sr3(PO4)2 | 0.5 | 191,800 |
| Ba3(PO4)2 | 0.5 | 195,500 |
| K3PO4 | 1.0 | 184,500 |
| Mg3(PO4)2 | 0.25 | 188,100 |
| Control | | 150,200 |

The lamps utilizing the phosphor of our invention were lehred at 1150° C. and maximum output obtained, while the lamps embodying the straight calcium zinc phosphate phosphor gave maximum output when lehred at 1000° C. Thus it can be seen that our improved phosphor allows higher lehring temperature which will reduce the tendency of the lamps to "wiggle."

It will be seen from the above that we have produced a thallium-activated calcium zinc phosphate phosphor with additions of a phosphate of Al, Ba, Sr, Mg, or K which has improved output in the erythemal region over that of the regular thallium-activated calcium zinc phosphate phosphor and which also has improved temperature stability.

We claim:

1. A phosphor having improved radiation in the erythemal range in response to 2537 A. U. radiation consisting essentially of a thallium-activated phosphate of calcium having in solid solution therewith from about 4% to about 12% of zinc phosphate, and also having in solid solution therewith one of the group consisting of 0.01% to 1% aluminum phosphate, from 0.01% to 1% magnesium phosphate, from .01% to 2.5% barium phosphate, from 0.01% to 2.0% strontium phosphate and from 0.01% to 2.5% potassium phosphate, all percentages being by weight of the final phosphor.

2. A phosphor having improved radiation in the erythemal range in response to 2537 A. U. radiation consisting essentially of a thallium-activated phosphate of calcium having in solid solution therewith from about 4% to about 12% by weight of said phosphor of zinc phosphate, and also having in solid solution therewith from .01% to 1% by weight of the said phosphor of aluminum phosphate.

3. A phosphor having improved radiation in the erythemal range in response to 2537 A. U. radiation consisting essentially of a thallium-activated phosphate of calcium having in solid solution therewith from about 4% to about 12% by weight of said phosphor of zinc phosphate, and also having in solid solution therewith from .01% to 2.5% by weight of the said phosphor of barium phosphate.

4. A phosphor having improved radiation in the erythemal range in response to 2537 A. U. radiation consisting essentially of a thallium-activated phosphate of calcium having in solid solution therewith from about 4% to about 12% by weight of said phosphor of zinc phosphate, and also having in solid solution therewith from .01% to 2.5% by weight of the said phosphor of potassium phosphate.

5. A phosphor having improved radiation in the erythemal range in response to 2537 A. U. radiation consisting essentially of a thallium-activated phosphate of calcium having in solid solution therewith from about 4% to about 12% by weight of said phosphor of zinc phosphate, and also having in solid solution therewith from .01% to 1% by weight of the said phosphor of magnesium phosphate.

6. A phosphor having improved radiation in the erythemal range in response to 2537 A. U. radiation consisting essentially of a thallium-activated phosphate of calcium having in solid solution therewith from about 4% to about 12% by weight of said phosphor of zinc phosphate, and also having in solid solution therewith from .01% to 2.0% by weight of the said phosphor of strontium phosphate.

7. A phosphor having improved radiation in the erythemal range in response to 2537 A. U. radiation consisting essentially of a thallium-activated phosphate of calcium having in solid solution therewith from about 4% to about 12% by weight of said phosphor of zinc phosphate, and also having in solid solution therewith approximately 0.25% by weight of said phosphor of aluminum phosphate.

8. A phosphor having improved radiation in the erythemal range in response to 2537 A. U. radiation consisting essentially of a thallium-activated phosphate of calcium having in solid solution therewith from about 4% to about 12% by weight of said phosphor of zinc phosphate, and also having in solid solution therewith approximately 0.5% by weight of said phosphor of strontium phosphate.

9. A phosphor having improved radiation in the erythemal range in response to 2537 A. U radiation consisting essentially of a thallium-activated phosphate of calcium having in solid solution therewith from about 4% to about 12% by weight of said phosphor of zinc phosphate, and also having in solid solution therewith approximately 0.5% by weight of said phosphor of barium phosphate.

10. A phosphor having improved radiation in the erythemal range in response to 2537 A. U. radiation consisting essentially of a thallium-activated phosphate of calcium having in solid solution therewith from about 4% to about 12% by weight of said phosphor of zinc phosphate, and also having in solid solution therewith approximately 0.5% by weight of said phosphor of potassium phosphate.

11. A phosphor having improved radiation in the erythemal range in response to 2537 A. U. radiation consisting essentially of a thallium-activated phosphate of calcium having in solid solution therewith from about 4% to about 12% by weight of said phospor of zinc phosphate, and also having in solid solution therewith approximately 0.25% by weight of said phosphor of magnesium phosphate.

References Cited in the file of this patent

UNITED STATES PATENTS

| 2,563,900 | Wollentin | Aug. 14, 1951 |
| 2,563,901 | Wollentin | Aug. 14, 1951 |
| 2,668,148 | Kroger | Feb. 2, 1954 |